UNITED STATES PATENT OFFICE

2,183,873

VAT DYESTUFFS OF THE ANTHRAQUINONE SERIES

Otto Schlichting and Karl Koeberle, Ludwigshafen-on-the-Rhine, Germany, assignors to General Aniline Works, Inc., New York, N. Y., a corporation of Delaware No Drawing. Application November 18, 1938, Serial No. 241,196. In Germany December 22, 1937

8 Claims. (Cl. 260—377)

The present invention relates to vat dyestuffs of the anthraquinone series.

We have found that compounds of the anthraquinone series corresponding to the general formula

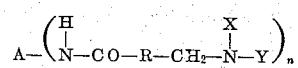

(wherein A stands for a radical of the anthraquinone series, R for a benzene radical, X for a member of the group consisting of hydrogen and alkyl, Y for a group selected from the class consisting of hydrogen, amino, alkyl, aralkyl, cycloalkyl, aryl and heterocyclic radical and $n$ for an integer less than 3) are valuable vat dyestuffs.

As examples of suitable initial materials there may be mentioned omega-chloralkylbenzoylaminoanthraquinones. They are obtained when any aminoanthraquinones are reacted in known manner with omega-halogenalkyl derivatives of cyclic carboxylic acids. The carboxylic acids should be in such a form or should be reacted under such conditions that the amino group of the aminoanthraquinones is acylated. For example the halides, anhydrides or amides of the omega-halogenalkyl derivatives of the cyclic carboxylic acids may be used. In many cases compounds having free carboxylic groups may also be used, for example when working in the presence of chlorsulphonic acid. The procedure may also be for example that acid halides are formed with thionyl chloride or other agents and caused to act on the aminoanthraquinones in the same working operation. For example an aminoanthraquinone, preferably in the presence of a diluent, may be heated with an omega-halogenalkyl derivative of the halide of a cyclic carboxylic acid. Especially suitable carboxylic acid halides of the said kind are the omega-chloralkyl- or omega-bromalkyl compounds. The reaction may however also be carried out with omega-iodo- or omega-fluoralkyl derivatives of such carboxylic acid halides. The omega-halogenalkyl group may also be contained in the molecule a number of times. In addition to the specially suitable omega-monohalogen compounds, the omega-di- and -trihalogen compounds may also be used for the reaction. The term "amino compounds of the anthraquinone series" includes not only any 1- or 2-aminoanthraquinones which may also contain other atoms or groups, as for example halogen, hydroxy, alkoxy, nitro, alkyl or aryl groups, but also includes polyaminoanthraquinones, aminoacylaminoanthraquinones, aminoalkylamino-anthraquinones and also amino compounds of vattable high molecular weight anthraquinone derivatives, as for example of anthraquinoneazoles, anthraquinoneacridones, dibenzanthrones or of anthraquinones containing attached rings for example in the 1,9-position, as for example of anthrapyrimidines, pyrazolanthrones or thiazolanthrones. These amino derivatives may also contain other atoms or atomic groups, as for example those of the abovementioned kind. The omega-halogenalkylaroylamino compounds thus obtained crystallize well, are often strongly colored and are generally speaking difficultly capable or incapable of being vatted.

Dyestuffs are prepared from the omega-halogen compounds thus obtainable by reaction with ammonia or ammonia derivatives containing at least one replaceable hydrogen atom. As ammonia derivatives for this reaction there may be mentioned hydrazines, hydroxylamine, primary and secondary aliphatic amines, as for example alkylamines, hydroxyalkylamines, such as butylamine, dibutylamine, dodecylamine, octodecylamine, ethanolamine, propanolamine, ethylene diamine, beta-dimethylaminoethylamine, hydroaromatic amines, as for example cyclohexylamine, or piperidine, aromatic amines, as for example aniline, toluidine, benzidine, anisidine, dianisidine, and aralkylamines, as for example benzylamine, para-aminobenzylamine or phenylethylamine, and also heterocyclic amines, as for example aminopyridines or aminoquinolines. Vattable amino compounds, as for example aminoanthraquinones, aminoanthrapyrimidines, aminophenylanthraquinones or aminophenylazoloanthraquinones are also suitable for the process. Furthermore ureas and acid amides may also be used. The reaction is preferably carried out in the presence of a diluent, as for example water, an alcohol, halogen benzene or nitrobenzene. It is usually advisable to add agents binding acids, as for example alkali acetate or carbonate, magnesium oxide or pyridine. The addition of copper, copper compounds or other substances promoting the reaction is also advantageous.

The new compounds are usually obtained in very good yields and in a good state of purity. Depending on the choice of initial materials, dyestuffs having a great variety of shades of color are obtained. Contrasted with the initial materials, the new compounds are usually more readily capable of being vatted. If necessary they may be purified by the usual methods, as for example by recrystallization or sublimation or by treatment with oxidizing agents, as for example with alkaline hypochlorite solution or with sodium bichromate in dilute sulphuric acid. The vats are usually red to red-violet in color. Generally speaking yellow to brown dyeings are obtained on vegetable fibres from the vat.

The following examples will further illustrate how the present invention is carried out in practice but the invention is not restricted to these examples. The parts are by weight.

*Example 1*

45 parts of 4-chlormethylbenzoyl chloride are added to a suspension of 24 parts of 1.5-diaminoanthraquinone in 250 parts of nitrobenzene and the mixture heated to boiling while stirring until hydrogen chloride no longer escapes. The reaction is usually completed in a few hours. The mass is allowed to cool and the compound formed is separated off by filtering it off by suction or by removing the solvent with steam. After drying, about 55 parts of a golden-yellow crystal meal are obtained which melts at above 360° C. The solution in strong sulphuric acid is yellow and the compound does not vat.

A mixture of 10 parts of the 1.5-di(4'-chlormethylbenzoylamino)-anthraquinone thus obtained, 1 part of copper acetate and 150 parts of 20 per cent aqueous ammonia is heated for 6 hours at 180° C. After cooling, the dyestuff is filtered off by suction, washed with water and dried. 9 parts of a brown final product are obtained which melts above 360° C. It dissolves in strong sulphuric acid giving a yellow-red coloration and dyes cotton fast yellow shades from a violet-red vat.

A similar dyestuff is obtained by using 1.8-di(4'-chlormethylbenzoylamino)-anthraquinone instead of 1.5-di-(4'-chlormethylbenzoylamino)-anthraquinone.

*Example 2*

A mixture of 10 parts of 1.5-di-(3'-chlormethylbenzoylamino)-anthraquinone, 15 parts of cyclohexylamine, 1 part of copper acetate and 200 parts of monochlorbenzene is heated to boiling for about 2 hours in a strirring vessel. The whole is then allowed to cool and the resulting dyestuff is filtered off by suction and washed with monochlorbenzene and methanol. After drying there are obtained 9 parts of a yellow crystal meal which dissolves in strong sulphuric acid giving a yellow coloration. The dyestuff dyes vegetable fibres fast greenish yellow shades from a violet-red vat.

Similar dyestuffs are obtained by using 1,5-di-(4'- or 2'-chlormethylbenzoylamino)-anthraquinone instead of 1,5-di(3'-chlormethylbenzoylamino)-anthraquinone. The omega-halogen compounds serving as initial materials may be prepared in the manner described in the first paragraph of Example 1.

*Example 3*

A mixture of 10 parts of 1-(4'-chlormethylbenzoylamino)-anthraquinone, 8 parts of para-toluidine, 1 part of cuprous chloride and 200 parts of ortho-dichlorbenzene is heated to boiling for about 2 hours in a stirring vessel. After cooling, the whole is filtered by suction and the residue washed with dichlorbenzene and methanol. After drying a yellow meal is obtained which dissolves in strong sulphuric acid giving a yellow coloration and dyes cotton or viscose artificial silk greenish yellow shades from a violet-red vat.

Aniline or other amines of the benzene series, as for example xylidines, anisidines or halogen- or nitroanilines may be used instead of toluidine. Similar dyestuffs are thus obtained.

*Example 4*

A mixture of 10 parts of 1,5-di-(4'-chlormethylbenzoylamino)-anthraquinone, 10 parts of ethanolamine, 1 part of copper acetate and 100 parts of ortho-dichlorbenzene is heated to boiling for an hour while stirring. After filtering by suction, washing with dichlorbenzene and drying, there are obtained 8.5 parts of a yellow-red crystal meal. The dyestuff dissolves in strong sulphuric acid giving a red coloration and dyes vegetable fibres yellow shades from a violet-red vat.

Similar dyestuffs are obtained from 1,5-di-(3'- or 2'-chlormethylbenzoylamino)-anthraquinone.

*Example 5*

A mixture of 10 parts of 1-(4'-chlormethylbenzoylamino)-anthraquinone, 7 parts of octodecylamine, 7 parts of pyridine and 100 parts of ortho-dichlorbenzene is heated to boiling for about an hour in a stirring vessel. The mass is then allowed to cool and is diluted with 100 parts of methanol; the crystal pulp is filtered off by suction, washed with methanol and dried. The compound is yellow, dissolves in strong sulphuric acid giving a yellow coloration and dyes vegetable fibres greenish yellow shades from a Bordeaux-red vat.

Similar dyestuffs are obtained with octylamine, dodecylamine, octodecenylamine and methyldodecylamine.

*Example 6*

A mixture of 10 parts of 1-(3'-chlormethylbenzoylamino)-anthraquinone, 13 parts of 1-amino-5-benzoylamino-anthraquinone, 7 parts of sodium acetate, 1 part of copper acetate and 150 parts of nitrobenzene is heated in a stirring vessel until the final product is free from chlorine. It is filtered off by suction, washed with nitrobenzene, methanol and water and dried. The dyestuff is a brown-red crystal meal which dissolves in strong sulphuric acid giving a yellow-red coloration and which dyes cotton brown-red shades from a bluish red vat.

A similar dyestuff is obtained by using 1-aminoanthraquinone instead of 1-amino-5-benzoylaminoanthraquinone.

*Example 7*

A mixture of 13 parts of 1-(4'-chlormethylbenzoylamino)-anthraquinone, 7 parts of 5-amino-1,9-anthrapyrimidine, 6 parts of sodium acetate, 1 part of copper acetate and 120 parts of ortho-dichlorbenzene is heated to boiling for about 6 hours while stirring. After working up, 15 parts of a dark brown dyestuff are obtained. It dissolves in strong sulphuric acid giving a yellow coloration and dyes cotton brown shades from a brown-red vat.

Similar dyestuffs are obtained by using 2- or 8-amino-1,9-anthrapyrimidine.

Example 8

10 parts of 1,5-di-(3'-chlormethylbenzoylamino)-anthraquinone, 100 parts of dimethylamine and 1 part of copper acetate are heated at 150° C. in a pressure-tight vessel for 10 hours. After cooling, the compound is filtered off by suction, washed with water and dried. 8.8 parts of a reddish brown crystal meal are obtained which dissolves in strong sulphuric acid giving a yellow-red coloration and which dyes vegetable fibres yellow shades from a violet-red vat.

Diethylamine and dibutylamine yield similar dyestuffs.

Example 9

10 parts of 1-benzoylamino-5-(4'-chlormethylbenzoylamino)-anthraquinone (obtainable by heating 1-amino-5-benzoylaminoanthraquinone with 4-chlormethylbenzoyl chloride in orthodichlorbenzene), 100 parts of a 25 per cent solution of methylamine and 1 part of copper acetate are heated in a pressure-tight vessel for 6 hours at 180° C. After working up, 9 parts of a flame-colored dyestuff meal are obtained. It dissolves in sulphuric acid giving a yellow-red coloration and dyes cotton yellow shades from a violet-red vat.

Example 10

10 parts of 1,5-di-(4'-chlormethylbenzoylamino)-anthraquinone, 100 parts of 25 per cent aqueous methylamine solution and 1 part of cuprous chloride are heated in a pressure-tight vessel for 10 hours at 150° C. After cooling, the resulting dyestuff is filtered off by suction, washed with water and dried. 9.2 parts of a flame-colored meal are thus obtained which may be purified by boiling up with trichlorbenzene. It dissolves in sulphuric acid giving a yellow-red coloration and dyes cotton golden-yellow shades from a violet-red vat.

Ethylamine, diethylamine, butylamine or cyclohexylamine may be reacted with 1,5-di-(4'-chlor- or 4'-bromomethylbenzoylamino)-anthraquinone in a similar manner. Instead of an aqueous solution of the amine, solutions in methanol or ethanol may also be used.

Example 11

A mixture of 10 parts of 1-(4'-chlormethylbenzoylamino)-anthraquinone, 6 parts of dehydrothiotoluidine, 6 parts of sodium acetate, 1 part of copper acetate and 100 parts of orthodichlorbenzene is heated to boiling for 2 hours in a stirring vessel. After working up, 9.5 parts of a yellow crystal meal are obtained which dissolves in sulphuric acid giving a yellow-red coloration. It dyes cotton greenish yellow shades from a bluish red vat.

Example 12

A mixture of 10 parts of 1,5-di(4'-chlormethylbenzoylamino)-anthraquinone, 10 parts of benzylamine, 5 parts of sodium acetate, 1 part of copper acetate and 150 parts of trichlorbenzene is heated to boiling in a stirring vessel until the final product is free from chlorine. The mass is worked up in the usual way and the dyestuff is obtained as a brown-yellow crystal meal which dissolves in sulphuric acid giving a yellow-red coloration and dyes cotton golden-yellow shades from a deep violet vat.

Example 13

10 parts of 1-(4'-chlormethylbenzoylamino)-anthraquinone, 100 parts of a 20 per cent aqueous solution of ethylene diamine and 1 part of copper acetate are heated in a pressure-tight vessel for 10 hours at 130° C. After cooling, the dyestuff is filtered off by suction, washed with water and dried. 9.2 parts of a golden-yellow crystal meal are obtained which dissolves in sulphuric acid giving a yellow-red coloration and dyes cotton greenish yellow shades from a red vat.

Example 14

A mixture of 15 parts of 1-(4'-chlormethylbenzoylamino)-anthraquinone, 1.5 parts of hydrazine hydrate, 10 parts of sodium acetate, 1 part of copper acetate and 150 parts of monochlorbenzene is heated to boiling for from 3 to 4 hours in a stirring vessel. After cooling, the yellow crystal pulp is filtered off by suction and washed with chlorbenzene, alcohol and water. After drying there are obtained 13 parts of a lemon-yellow crystal meal, which dissolves in sulphuric acid giving a yellow-red coloration and which dyes cotton greenish yellow shades from a red vat.

If 2-(4'-chlormethylbenzoylamino) - anthraquinone be used instead of the 1-(4'-chlormethyl) compound, a vat dyestuff giving greenish yellow dyeings is also obtained.

The dyestuff derived from 1-benzoylamino-5-(4' - chlormethylbenzoylamino) - anthraquinone and hydrazine dyes cotton golden-yellow shades from a violet-red vat. By reacting the said acylamines with phenylhydrazine, yellow dyestuffs are also obtained.

Example 15

A mixture of 10 parts of 1-(4'chlormethylbenzoylamino)-anthraquinone, 2.5 parts of 4,4'-diaminodiphenylmethane, 5 parts of sodium acetate, 1 part of copper acetate and 150 parts of trichlorbenzene is heated to boiling for 2 hours in a stirring vessel. After working up, the dyestuff is obtained in the form of an olive-tinged yellow meal. It dissolves in sulphuric acid giving a yellow-red coloration and dyes cotton greenish yellow shades from a violet-red vat.

4,4'-diaminobenzophenone, benzidine, dianisidine and para-phenylene-diamine may be reacted with the said acylamine in the same way as 4,4'-diaminodiphenylmethane. The said amines may also be caused to act on 1-(2'- or 3' - chlormethylzenzoylamino) - anthraquinone instead of on the 1-(4'-chlormethyl) - compound. The dyestuffs thus formed have properties similar to those above described.

Example 16

A mixture of 10 parts of 1,5-di(4'-chlormethylbenzoylamino)-anthraquinone, 7 parts of 2-aminocarbazole, 8 parts of sodium acetate, 1 part of copper acetate and 150 parts of trichlorbenzene is heated to boiling for 2 hours in a stirring vessel. After working up, 13 parts of a brownish yellow crystal meal are obtained which dissolves in sulphuric acid giving a yellow coloration. It gives a violet vat and dyes cotton yellow shades therefrom.

3-aminocarbazole, 2- or 3-aminodiphenylene oxide, 4-aminobenzophenone or 4-chlor-4'-aminodiphenyl yield similar dyestuffs.

Example 17

33 parts of 5-amino-Py3-carbethoxy-1,9-anthrapyridine, 23 parts of 4-chlormethylbenzoyl chloride and 300 parts of nitrobenzene are heated in a stirring vessel until hydrogen chloride no longer escapes. After cooling, the mass is worked up in the usual manner and the 5-(4'-chlormethylbenzoylamino) - Py3 - carbethoxyl - 1,9-anthrapyridine is obtained as a yellow crystal meal which dissolves in sulphuric acid giving a red coloration.

A mixture of 10 parts of the said compound, 10 parts of cyclohexalamine, 5 parts of sodium acetate, 1 part of copper acetate and 100 parts of ortho-dichlorbenzene is heated to boiling until the final product is free from chlorine. The whole is allowed to cool and the residue is filtered off by suction and washed with ortho-dichlorbenzene, methanol and water. After drying, the dyestuff is obtained as a golden-yellow crystal meal. It dissolves in sulphuric acid giving a red coloration.

4- or 5-amino-1,9-anthrapyrimidone, aminobenzanthrones, aminopyrazolanthrones or aminothiazolanthrones may be used for the above reactions instead of 5-amino-Py3-carbethoxy-1,9-anthrapyridine. Similar dyestuffs are thus obtained.

Example 18

A mixture of 10 parts of 4-(3'-chlormethylbenzoylamino) - Bz3,5 - dichlor - 2,1(N) - anthraquinonebenzacridone (obtainable from 4-amino - Bz3,5 - dichlor - 2,1(N) - anthraquinonebenzacridone by heating with 3-chlormethylbenzoyl chloride in nitrobenzene), 10 parts of ethanolamine, 1 part of copper acetate in and 150 parts of ortho-dichlorbenzene is heated to boiling for from about 2 to 3 hours. The mixture is then worked up and the dyestuff obtained as a dark violet meal. It dissolves in sulphuric acid giving a yellowish red coloration and dyes cotton violet shades from a brown-violet vat.

The omega-chlormethylbenzoylamino compounds of 2-[1-aminoanthraquinonyl-2]-[anthraquinono-4,5-azoles], as for example 2-[1-amino - 4 - omega-chlormethylbenzoylaminoanthraquinonyl - 2] - [anthraquinone - 2',3',4,5-oxazole], 2 - [1-amino - 4 - omega - chlormethylbenzoylaminoanthraquinonyl - 2] - [anthraquinono - 2',1'(N),4,5 - oxazole], 2 - [1 - amino - 4 - omegachlormethylbenzoylaminoanthraquinonyl-2] - [anthraquinono - 2',3',4,5 - thiazole], 2 - [1-amino - 4 - omegachlormethylbenzoylaminoanthraquinonyl-2] - [anthraquinono-2'(N),1'(S),-4,5-thiazole], or of C-aminophenylazoloanthraquinones, as for example C-4'-aminophenyl-2,1(N)-oxazoloanthraquinone, C-4'-aminophenyl - 1(S),2(N) - thiazoloanthraquinone or C-4'-aminophenyl-1,2-imidazoloanthraquinone may be reacted with the abovementioned amines in the same way.

Example 19

A mixture of 10 parts of 1,5-di-(4'-chlormethylbenzoylamino) anthraquinone, 8 parts of benzamide, 6 parts of sodium acetate, 1 part of copper acetate and 150 parts of nitrobenzene is heated to boiling while stirring until the final product is free from chlorine. After cooling, the residue is filtered off by suction and washed with nitrobenzene, methanol and water. A golden-yellow crystal meal is thus obtained which dissolves in sulphuric acid giving a reddish-yellow coloration and which dyes vegetable fibres yellow shades from a dark-red-violet vat.

Para-toluenesulphamide or anthraquinone-2-carboxylic acid amide may be reacted with the said 4'-chlormethyl compound instead of benzamide, yellow dyestuffs also thus being obtained.

What we claim is:

1. A vat dyestuff corresponding to the general formula

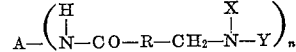

wherein A stands for a radical of the anthraquinone series, R for a benzene radical, X for a member of the group consisting of hydrogen and alkyl, Y for a group selected from the class consisting of hydrogen, amino, alkyl, aralkyl, cycloalkyl, aryl and heterocyclic radical and $n$ for an integer less than 3.

2. A vat dyestuff corresponding to the general formula

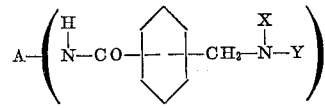

wherein A stands for a radical of the anthraquinone series, X for a member of the group consisting of hydrogen and alkyl, Y for a group selected from the class consisting of hydrogen, amino, alkyl, aralkyl, cycloalkyl, aryl and heterocyclic radical and $n$ for an integer less than 3.

3. A vat dyestuff corresponding to the general formula

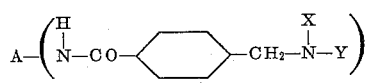

wherein A stands for a radical of the anthraquinone series, X for a member of the group consisting of hydrogen and alkyl, Y for a group selected from the class consisting of hydrogen, amino, alkyl, aralkyl, cycloalkyl, aryl and heterocyclic radical and $n$ for an integer less than 3.

4. A vat dyestuff corresponding to the general formula

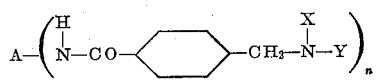

wherein A stands for an anthraquinonyl, linked in alpha-position, X for a member of the group consisting of hydrogen and alkyl, Y for a group selected from the class consisting of hydrogen, amino, alkyl, aralkyl, cycloalkyl, aryl and heterocyclic radical and $n$ for an integer less than 3.

5. A vat dyestuff corresponding to the general formula

wherein A stands for an anthraquinonyl linked in alpha-position, Y for a group selected from the class consisting of hydrogen, amino, alkyl, aralkyl, cycloalkyl, aryl and heterocyclic radical, $n$ for an integer less than 3.

6. The vat dyestuff corresponding to the formula

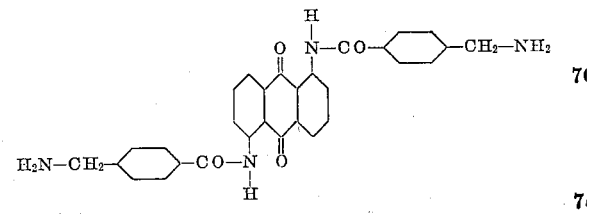

which dissolves in strong sulphuric acid giving a yellow-red coloration and dyes vegetable fibres fast yellow shades from a violet-red vat.

7. The vat dyestuff corresponding to the formula

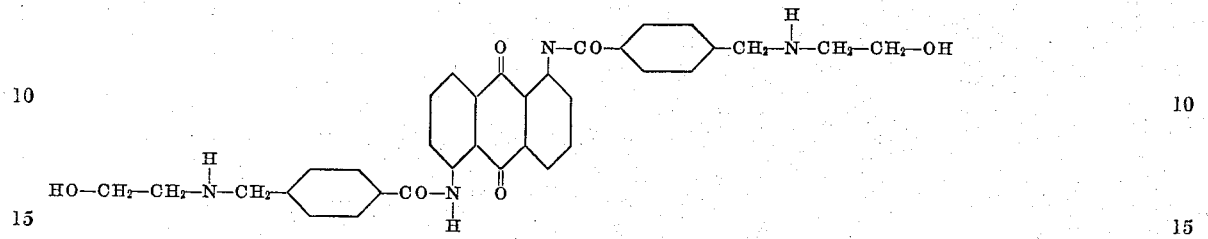

which dissolves in strong sulphuric acid giving a red coloration and dyes vegetable fibres yellow shades from a violet-red vat.

8. The vat dyestuff corresponding to the formula

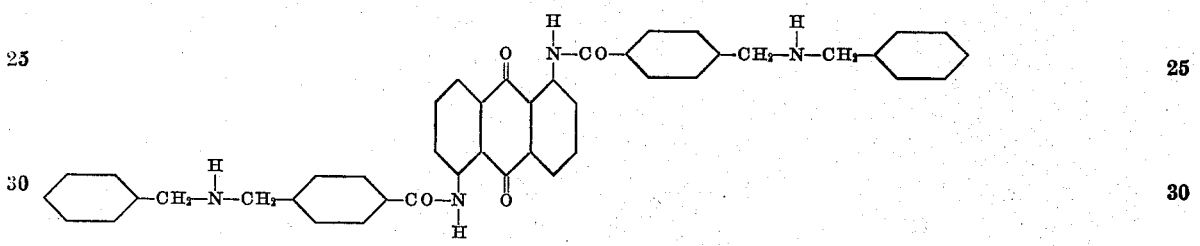

which dissolves in strong sulphuric acid giving a yellow-red coloration and dyes vegetable fibres golden-yellow shades from a deep violet vat.

OTTO SCHLICHTING.
KARL KOEBERLE.